April 13, 1943. R. M. GARRISON 2,316,413
OVAL PLUG VALVE CHAMBER
Filed Aug. 11, 1941 3 Sheets-Sheet 1

R. M. GARRISON
INVENTOR.
BY Lester B. Clarke.
ATTORNEY.

Patented Apr. 13, 1943

2,316,413

UNITED STATES PATENT OFFICE 2,316,413

OVAL PLUG VALVE CHAMBER

Ranald M. Garrison, Houston, Tex., assignor to Mission Manufacturing Company, Houston, Tex.

Application August 11, 1941, Serial No. 406,338

1 Claim. (Cl. 251—91)

The invention relates to a plug valve chamber of a particular configuration in order to insure that a positive seal will be obtained when the valve is in closed position.

In the manufacture of plug valves where a circular plug is rotated in a chamber to open and closed position, considerable difficulty has been encountered due to the fact that the plug is of one diameter and the plug chamber of another and slightly larger diameter. The result of these two different diameters is that the plug tends to engage the chamber at a line contact vertically along the face of the downstream side. Due to the fact that the plug is of lesser diameter than the chamber, the arc of the plug and the chamber gradually diverge from each other so that by the time the width of the passage through the valve is reached, there may be a substantial opening between the plug and the face which results in leakage.

The general idea of providing contacting surfaces on the plug and the chamber of substantially the same arc is disclosed in the copending application for patent of A. S. Volpin, Serial No. 330,831, filed April 22, 1940, for Plug and seat for valves, wherein the chamber is circular and the plug somewhat oval with its major axis across the valve and its minor axis longitudinally of the valve when the plug is closed so that the plug can shift slightly so that the two substantially identical arcs on the plug and the seating face of the chamber can cooperate together to provide a rather wide seal covering the passage through the valve.

The present invention relates to the same general idea but is directed to a combination wherein the plug is round and the chamber somewhat oval with the major axis of the oval chamber extending along the passage through the valve and the minor axis crosswise or transversely of the valve.

Such an arrangement lends itself to economical manufacturing and permits the production of a satisfactorily operating plug valve.

It is one of the objects of the invention to provide an oval chamber in a plug valve housing.

Another object of the invention is to provide the combination of an oval chamber and a plug, round in cross section, in a plug valve combination.

Another object of the invention is to provide an oval chamber for plug valves having its major axis axially of the valve passage.

Another object of the invention is to grind the plug chamber in a plug valve housing with a grinder set to grind a diameter the same as that of the plug which is to be received therein, but where the grinder is offset in grinding the end faces of the chamber a slight amount so as to provide a slightly oval chamber.

Another object of the invention is to grind a plug valve chamber in an oval configuration wherein the arcs of the end faces in the passage through the valve will be the same as the arc of the plug to be received in the chamber.

Another object of the invention is to grind a valve chamber into an oval configuration by the use of a grinding compound.

Still another object of the invention is to grind a plug valve chamber in an oval configuration by shifting the carriage carrying the valve housing laterally of the grinder.

Other and further objects of the invention will be readily apparent when considered in connection with the following description and the accompanying drawings wherein.

Figure 1:
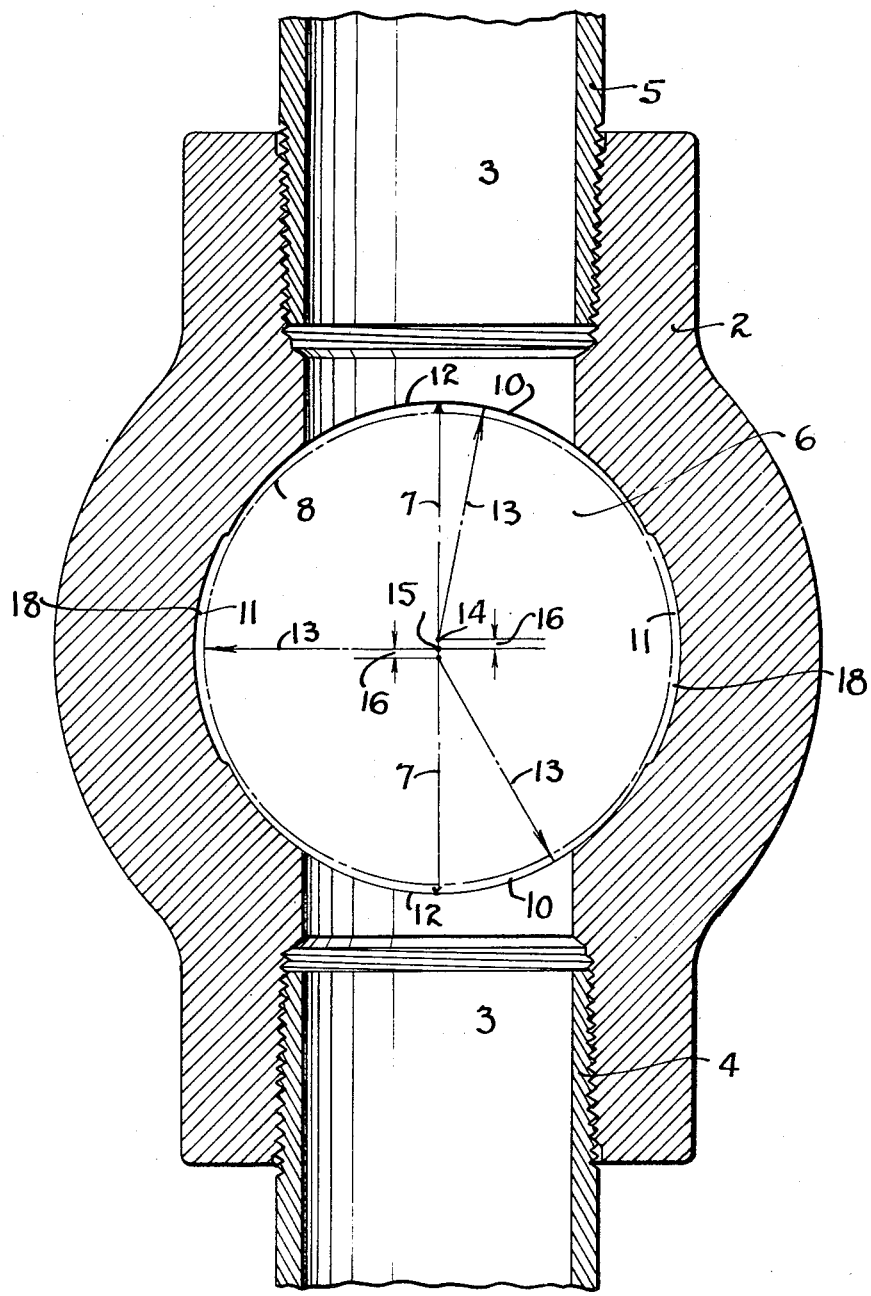
Fig. 1 is a transverse vertical section of a plug valve housing wherein the chamber is ground in a substantially oval configuration to provide a sealing face for cooperation with the circular plug member.

In Fig. 1 a valve housing is indicated generally at 2 and may be of any suitable size or material, such housing having a passage 3 therethrough in the ends of which the connections 4 and 5 of the flow lines are made. Intersecting the passage 3 is the plug valve chamber 6, and it is to this chamber that the invention is directed. The usual practice is to provide a circular chamber which would receive a circular plug member. As indicated hereinbefore, however, where the plug valve is of one diameter and the face of the chamber of a slightly larger diameter, when the pressure is applied to the plug member when it is closed the pressure shifts the plug member slightly to contact the downstream face of the chamber.

Due to the fact that the plug member is of slightly less diameter, it seems obvious that the two arcs would gradually diverge, leaving a very slight opening between the plug and the sealing face by the time the width of the passage through the valve is reached.

In lubricated valves particularly, attempts have been made to fill this space caused by the diverging arcs with a lubricant or sealing material, but in actual practice the material wastes away by being forced into the passage through the valve and considerable difficulty in maintaining a lubricant seal has thereby been encountered. In the present construction, therefore, the valve chamber 6 is of a peculiar configuration in that it is slightly oval and for purposes of description, the oval may be detailed as having its major axis, indicated by the line 7, disposed longitudinally of the passage 3 through the valve and, of course, its minor axis would be normal thereto or transversely of the passage 3 through the valve.

The size of the plug member is illustrated by the dotted line 8, but the plug is not shown in this view.

It seems obvious that if the plug chamber were ground on a diameter identical with that of the plug member that it would be impossible to insert the plug member. For purposes of description, the chamber 6 will be described as having the ends 10 and the sides 11. Each end 10 is formed by the sealing face 12, and this face 12 is ground to a radius 13 which is identical with the radii of the plug member. It will be noted that the center 14 for each of the radii 13 in the grinding of the faces 12 is offset along the major axis 7 to either side of the center 15 by an amount 16 which is equal to one-half the clearance which will be provided between the plug and the chamber. In this manner the chamber 6 will be longer on its major axis 7 by twice the distance 16.

It will be noted that there is a recess 18 at each side of the chamber 6. This recess will preferably be formed or forged in the housing 2 at the time it is manufactured so that the surface of this recess will not necessarily need to be ground or finished.

This recess is provided because the radius 13 of the plug will be the same as the radius of the chamber in a transverse direction, and this additional clearance is therefore necessary so as to accommodate the slight shifting movement of the plug in the chamber when the pressure is applied.

It should be borne in mind that the distances being considered are measured in thousandths and ten thousandths of an inch and are greatly magnified and out of proportion in the drawings for purposes of illustration.

It is intended that the chamber 6 may be ground in any suitable manner, but the preferred method would be to take a grinder capable of grinding a diameter the same as the diameter of the plug, which grinder would grind a diameter having a radius equal to the distance 13. This grinder would be suitably mounted in a lathe or other piece of equipment and the housing 2 placed thereover, the housing being supported upon a suitable carriage capable of being shifted. As the grinding operation proceeded the housing 2 should be shifted along the major axis 7 so as to grind the faces 12 in the ends of the chamber, the center of the chamber being shifted laterally until the shifting amounted to a distance equal to the distance 16. This shifting would be on one side of the center in grinding one end face 12, and on the opposite side of the center in grinding the other face 12. These positions are illustrated in Fig. 1 of the drawings.

Figure 2:
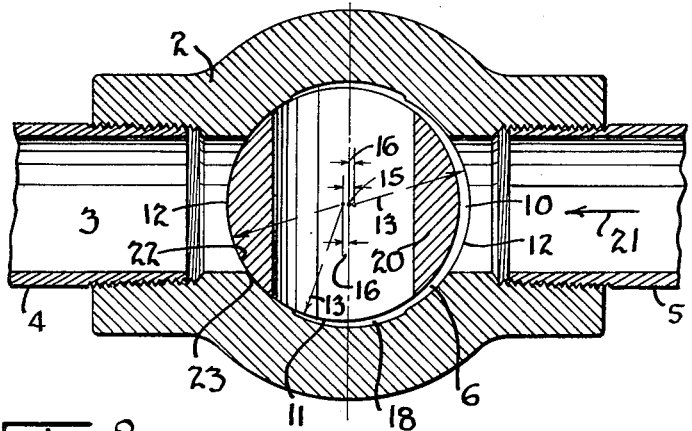
Fig. 2 is a view of the housing of Fig. 1 with the plug in closed and sealing position wherein the pressure is applied from the righthand side.

Fig. 2 illustrates the construction just described with the plug member 20 in position in the chamber 6. The pressure is being applied from the righthand side, as illustrated by the arrow 21, which will cause the plug 20 to shift to the left so as to engage the lefthand end face 12.

In view of the fact that the arc 22 of the plug is ground on the same radius as the face 12, it seems obvious that the faces 12 and 22 will fit almost precisely so as to form a wide contact face with the end 12 of the chamber. This contact is intended to be wide enough to extend beyond the width of the passage 3 so that a seal will be maintained at least as far as the point 23 at the extreme width of the passage 3. It will be noted that the recesses 18 have permitted this shifting of the plug member 20.

Figure 3:
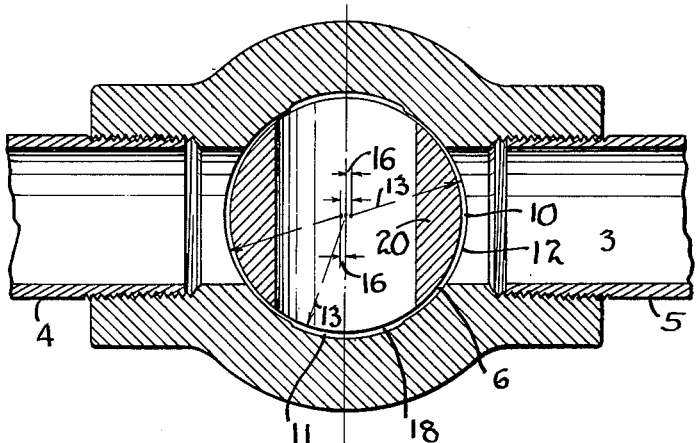
Fig. 3 is a view similar to Fig. 2, except that the plug is centered in an oval chamber.
Figure 4:
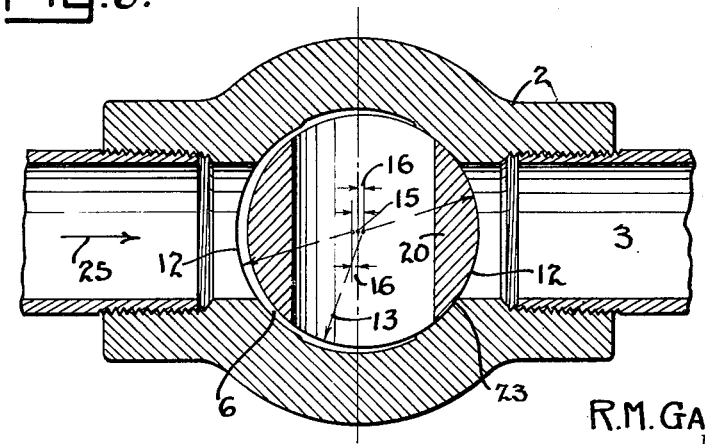
Fig. 4 is a view similar to Fig. 2, except the pressure is being applied from the lefthand side.

Fig. 3 illustrates the same construction, but shows the plug member 20 as being exactly centered in the chamber, while Fig. 4 shows the pressure being applied from the lefthand side, as shown by the arrow 25.

Figure 5:
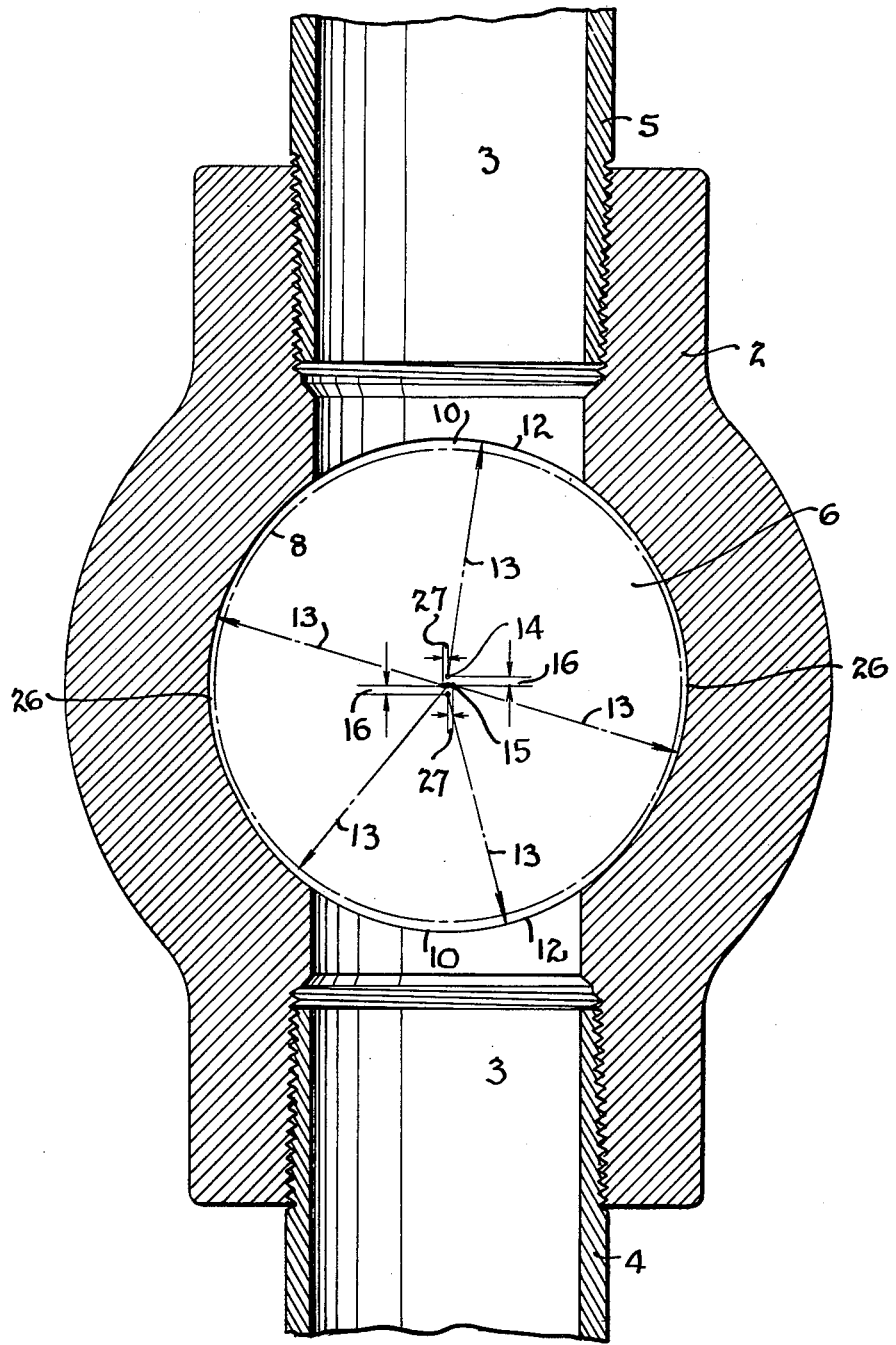
Fig. 5 shows a modified form of the housing of Fig. 1 wherein the relief at the sides is obtained by the lateral shifting of the housing relative to the grinder.

Fig. 5 shows a slightly modified form of the device wherein the recesses 18 of Fig. 1 have been omitted and instead, the housing 2 has been shifted slightly in a transverse direction of the passage 3 during the grinding operation so that the side faces 26 of the chamber 6 will be ground on the same radius 13 as the end faces 12. This lateral shifting, however, is equal to the distance 27 shown in Fig. 5, and it will be noted that the distance 27 is less than the distance 16, it being intended that the lateral shift 27 will be very, very slight so as to provide only a sufficient clearance to allow the plug to shift the distance 16. As mentioned hereinbefore, the figures of the drawings greatly exaggerate the distances and proportions of the parts.

In the manufacture of the oval valve chamber as herein described, the grinding operation is greatly simplified because all of the faces of the chamber can be completely ground by merely shifting the casting or forging, which is the housing 2. A suitable grinding compound may be used in the finishing operations if desired.

Broadly, the invention contemplates the provision of an oval plug chamber for plug valves wherein the arcs of the end faces in the passage through the valve are the same as the arc of the plug to be received in the chamber.

What is claimed is:

A plug valve including a housing having a passage therethrough, a cylindrical ported valve plug, an oval bore in said housing intersecting said passage to rotatably receive said plug, said plug having imperforate portions thereon to seal with the bore where the passage enters and leaves the bore, the bore of the housing about such passages being curved on a circular arc of the same radius as the surface of the cylindrical plug so that when the imperforate area of the plug engages the end of the oval bore of the housing there will be two circularly curved surfaces of the same radius in contact on the downstream side of the valve to provide a closure.

RANALD M. GARRISON.